C. H. BARRETT.
COMMODE.
APPLICATION FILED JUNE 6, 1911.

1,025,114.

Patented May 7, 1912.

UNITED STATES PATENT OFFICE.

CLINTON H. BARRETT, OF NEW YORK, N. Y.

COMMODE.

1,025,114.  Specification of Letters Patent.  Patented May 7, 1912.

Application filed June 6, 1911. Serial No. 631,535.

*To all whom it may concern:*

Be it known that I, CLINTON H. BARRETT, a citizen of the United States, and a resident of the city of New York, borough of Manhattan, in the county and State of New York, have invented a new and Improved Commode, of which the following is a full, clear, and exact description.

This invention relates to a new and improved form of commode, and is especially adapted for use in sick rooms, hospitals, &c.

An object of my invention is to provide a simple, neatly constructed article of this character, which is hermetically sealed even while the cover is removed.

A further object of my invention is to provide a device which may readily be taken apart for cleaning, and which will form a water seal between its several parts when used.

I attain the above outlined objects by disposing within an outer cylindrical receptacle, a common construction of water closet bowl having an integrally formed depending rim disposed within and conforming substantially to the contour of the outer receptacle. Disposed within the receptacle and below the opening of the bowl is a jar normally filled with water.

With the above and other objects in view, as will more fully hereinafter appear, the present invention consists in certain novel details of construction and arrangement of parts hereinafter fully described, illustrated in the accompanying drawings, and more particularly pointed out in the appended claim.

Reference is to be had to the accompanying drawings, forming a part of this specification, in which similar characters of reference indicate corresponding parts in both the figures, and in which—

Figure 1:
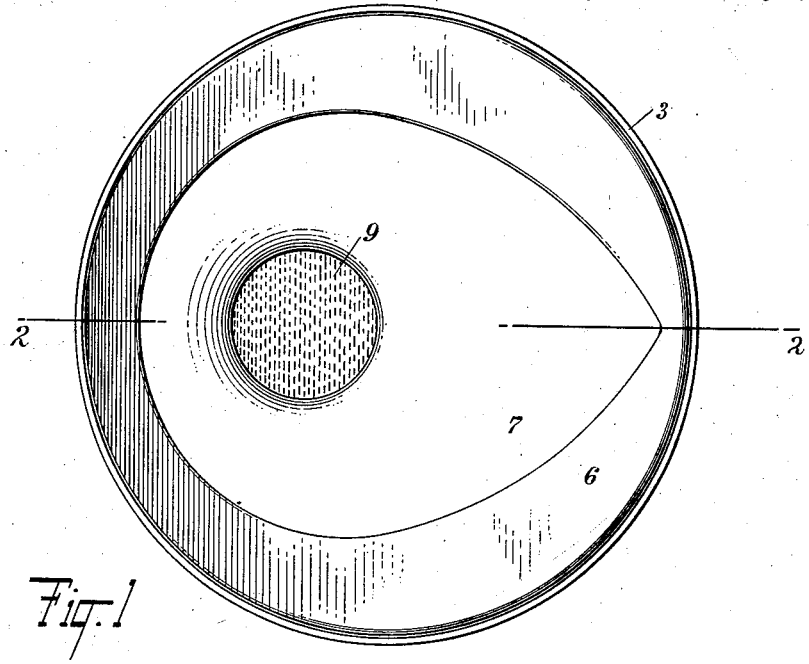
Figure 2:
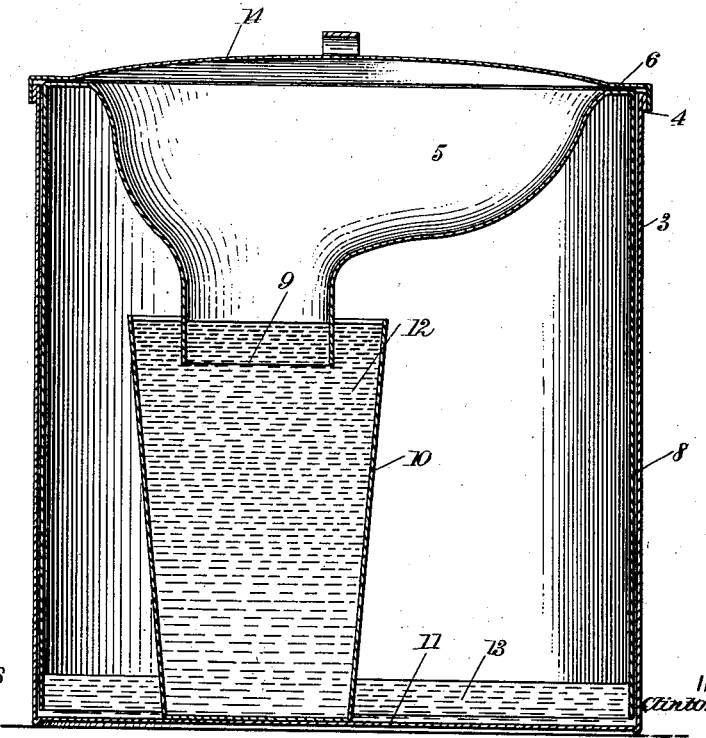

Figure 1 is a plan view looking down upon a preferred embodiment of my invention with the cover removed, and Fig. 2 is a vertical transverse sectional view taken on the line 2—2 of Fig. 1.

Described more in detail, my improved commode comprises an outer cylindrical receptacle 3 of any preferred material, the upper edge of which is turned outward to form a lipped edge 4. Disposed within the receptacle 3 is a bowl 5 of the common water closet construction, the upper edge 6 of which is extended outwardly from the hole 7 and is then bent into a depending flange 8 of a length but slightly shorter than the height of the receptacle 3 and conforming in configuration to the contour of said receptacle. Disposed beneath the opening 9 of the bowl 5, is a slop jar 10 of any desired configuration, which jar rests upon the bottom 11 of the outer receptacle 3 and is normally filled with water 12, said jar being of a height sufficient to bring the water a short distance above the opening 9 of the bowl 5. Water, as shown at 13, may be placed in the bottom of the receptacle 3, if desired, but this water is not necessary to obtain the full advantages of my improved commode, for should any slop be placed in the jar 10, the water 12 will overflow into the receptacle 3 and will form a water seal beneath the depending flange 8 and the side of the receptacle 3. It will be seen that by this construction, there is no outlet to the outside, there being a water seal between the bowl 5 and the jar 10, and it will also be seen that there is a water seal between the depending flange 8 and the receptacle 3, thereby forming a commode from which it is impossible for any odors to escape. If desired, any form of flanged cover 14 may be placed on the commode to close the same when not in use.

It will be seen that this device may be used repeatedly without emptying the receptacle 10, and that there is no possibility of any odors escaping from said receptacle. Further, it will be noted that direct vertical access is obtained to the receptacle through the opening 9.

Having thus described my invention, I claim as new and desire to secure by Letters Patent:

In a commode, an outer cylindrical receptacle, a bowl having a cylindrical depending flange telescoping within said receptacle and of a length slightly less than the depth of said receptacle, said bowl having a depending open end positioned within said flange and integral therewith, and a slop jar disposed within said receptacle, said jar normally filled with water, said open end projecting slightly below the level of the water in the jar, whereby slop falling into said jar will cause the water therein to flow over into the receptacle to form a water seal between said bowl and receptacle.

In testimony whereof I have signed my name to this specification in the presence of two subscribing witnesses.

CLINTON H. BARRETT.

Witnesses:
 W. S. ORTON,
 J. P. DAVIS.

Copies of this patent may be obtained for five cents each, by addressing the "Commissioner of Patents, Washington, D. C."